United States Patent [19]

Ellis

[11] Patent Number: 5,485,767
[45] Date of Patent: Jan. 23, 1996

[54] SAW BLADE MACHINING SYSTEM

[76] Inventor: Glynn A. Ellis, Sutttonfields Dr., Sutton Bonnington, Loughborough, Leicestershire, United Kingdom, LE12 5GB

[21] Appl. No.: 146,146

[22] PCT Filed: May 7, 1992

[86] PCT No.: PCT/GB92/00833

§ 371 Date: Jan. 4, 1994

§ 102(e) Date: Jan. 4, 1994

[87] PCT Pub. No.: WO92/19406

PCT Pub. Date: Nov. 12, 1992

[30] Foreign Application Priority Data

May 7, 1991 [GB] United Kingdom .................. 9109832

[51] Int. Cl.[6] ........................................... B23D 63/14
[52] U.S. Cl. ........................................... 76/40; 76/37
[58] Field of Search ..................... 76/37, 40, 36

[56] References Cited

U.S. PATENT DOCUMENTS 4,098,149  7/1978  Wright ....................................... 76/40
4,532,830  8/1985  Vollmer et al. ........................... 76/40

Primary Examiner—Hwei-Siu Payer
Attorney, Agent, or Firm—Locke Reynolds

[57] ABSTRACT

A machine for use in the manufacture of saw blades includes apparatus for performing a plurality of machining operations on the tips of individual teeth of the saw blades. Each tip to be machined is positioned in turn at a point coincident with a horizontal axis X normal to the body of the saw blade. The machine includes a main frame having a pivot coincident with the axis X. The front face and top face are machined by apparatus supported on a first yoke mounted on the pivot and situated to the right of a vertical plane containing the axis X. All other apparatus for machining other aspects of the blade tip including the side faces, steel relief, face profiling, grooving, bevelling, quill grinding, etc., are supported on a second yoke mounted on the pivot and situated to the left of the vertical plane containing the axis X.

20 Claims, 10 Drawing Sheets

SAW BLADE MACHINING SYSTEM

FIELD OF THE INVENTION

This invention is concerned with machines and systems for producing saw blades having hard material tips.

BACKGROUND OF THE INVENTION

Commonly used materials for the hard material tips includes rungsten carbide; Stellite etc.

It is a very well established practice to provide hard metal tips for circular and linear saw blades by mounting to the individual teeth of the blade tips which have been previously shaped so as generally to conform the the finally required shape to the tip.

In use the faces of the tips need to be accurately ground so as to produce a series of surfaces bevelled or otherwise which bear very carefully defined angular relationships one to the other.

In particular, the faces to be thus machined include the front face of the tip, i.e., that face which forms the leading face of the tip when a saw is in use; the top face of the tip which is the face most remote from the base of the tip and the two side faces.

In addition to the faces of the tip itself it is usually necessary to be able to machine the outermost peripheral part of the tooth itself this being commonly referred to as steel relief.

It will be understood by those skilled in the art that the machining of the tip front face must be such as not to damage the tooth gullet. The machining of the front faces is itself a relatively complex matter since the face may be required to slope downwardly and rearwardly, may required to be bevelled, grooved, with bevelling etc., differing from tip to tip.

In addition, it is important that the machining of the side faces does not unnecessarly remove material from the side faces of the tooth.

The machining of the top face of a tooth effectively sets the location of the tip cutting edge, this being the line interface between the top face and the front face.

In relation to these two faces it is important to bear in mind that according to the specific requirements for a saw blade that the top faces can be machined so that the cutting edge is effectively parallel to the axis of the blade, or is inclined so that each end of the cuting edge is higher than the other. Furthermore, it is also possible that the inclination of the cutting edge of successive tips should be oppositely inclined with respect to each other.

In addition, either or both the top and front faces can be bevelled. This bevelling can provide two or three sections to a face, and may Be symmetrical or asymmetrical as required.

Finally the machining of the side faces can involve dishing of these faces in such manner that the cutting edge ends appear to sweep outwards to distinct points From the forgoing it will be appreciated that the machining of the tips provided upon for example, a circular saw blade is a very complicated process.

THE PRIOR ART

Many proposals have been made for the production of machines which are able to deal with the machining of various faces of the tips. It is also known to provide machines which enable more than one of the faces of a tip that are required to be machined to be machined without it being necessary to displace the blade tip being machined from its initial position.

OBJECTS OF THE INVENTION

It is an object of the present invention to provide a machine for the machining of the hard material tips provided upon saw blades which is capable of being utilised for the grinding of various combinations of machining operations on the faces of the tips and the tooth itself.

STATEMENTS OF INVENTION

According to a first aspect of the invention there is provided a machine for grinding the hard material tips provided upon saw blades, including means for machining the front face, top face and the side faces of the tips to be machined without it being necessary to displace the tip being machined from a machining position to which the tip is initially set for the purpose of it being machined, characterised in that the means for machining of the front and top faces of the tips are located to one side of a vertical plane passing through a machining position to which a tip is set for the purpose of the machining of faces of the tip, and in that the means for the machining of the side faces of the Lips and/or the machining of the steel relief groove in the blade and/or grooves, slots, in the top and front faces of the tipsare operationally located at the other side of the said plane.

Preferably, the machine includes arrangements whereby support means are provided for so mounting the means for machining tip front faces that the tip front face machining tool carried by the mounting means is so positionally adjustable that the front face hook angles can be selectively set, and such that the movement of the tool lengthwise of the front face can also be selectively set.

Conveniently, the support means is pivotally mounted for pivotal movement about a reference axis defined by said machining position, and in that the angle of tilt of the support means with respect to a horizontal plane including said axis is utilised to set a requisite hook angle.

In a preferred construction the mounting means for the machine tool for machining the tip front faces is adapted also to mount a machine tool for machining the top faces of the tips; the arrangement being such that the two tools carried by the mounting means can be interchangeably moved between a rest or retracted position and an tip machining position.

In accordance with a further aspect of the invention the machine is based upon a modular concept in that at any one time at least three various forms of machine tool can be presented to tip to be machined.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 2:
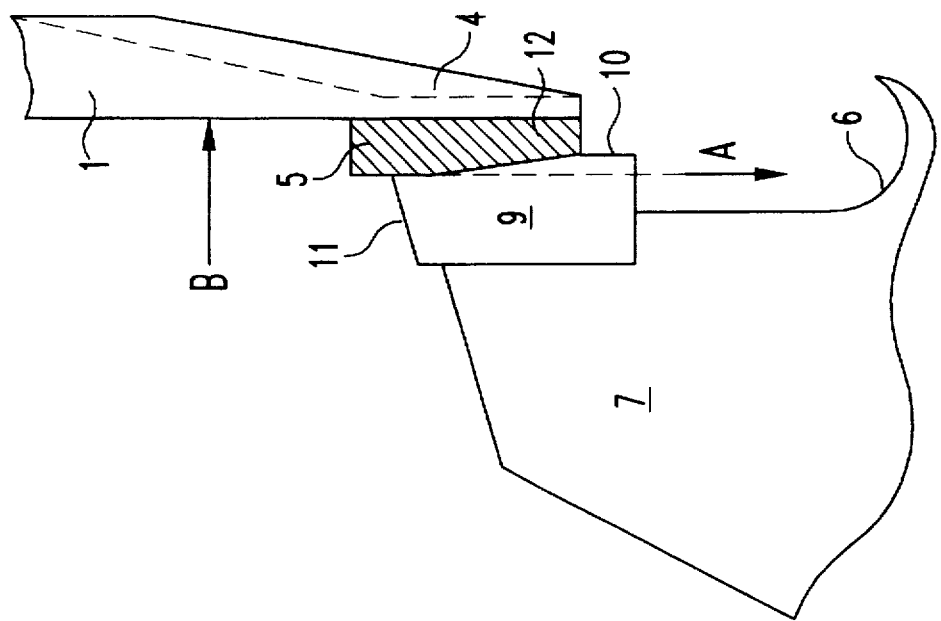
FIG. 2 illustrates schematically forces involved in machining a tooth tip front face with the grinding wheel of FIG. 1.
Figure 1:
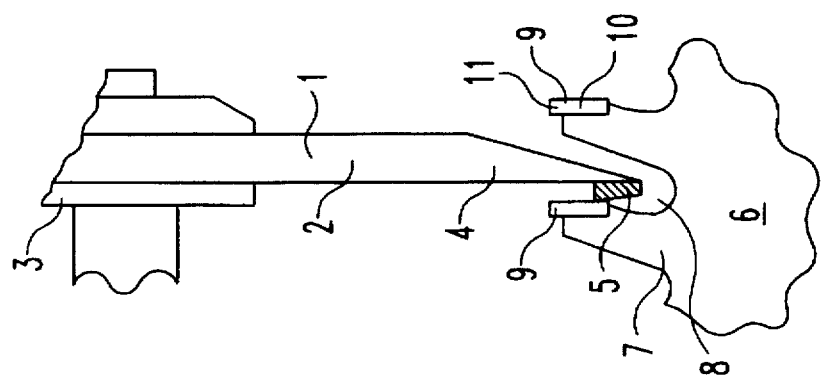
FIG. 1 schematically illustrates a known form of grinding wheel when in its saw blade tooth tip front face grinding position.

Before considering the structure and operational functions of the machine of the present invention it is convenient to consider a major problem arising from the use of the commonly used disc like diamond tipped grinding wheels by referring to FIGS. 1 and 2. Thus, FIG. 1 schematically illustrates a known form of diamond grinding wheel 1 including a main body 2 journalled for operational rotation on a drive arbor 3. The wheel 1 has an annular peripheral region 4 provided with a peripheral layer 5 of diamond grinding material.

In the Figure the wheel 1 is illustrated in its operational relationship to a saw blade 6 having teeth 7 and gullets 8, therebeing on each tooth 7 a hard material tip 9 with a front face 10 and top face 11.

Since the blade teeth 7 of present day saw blades 6 can have very small tooth pitches i.e., 8 millimetres, the tips 9 to be ground are relatively close to each other so that the separation therebetween is relatively small, leaving little clearance for the grinding wheel 1. Thus it is necessary for the peripheral region 4 of the grinding wheel to taper as indicated in FIG. 2 so as to be able to enter the tooth gullets 8 of the saw blade 6 to machine a tip front face 10.

Hence the peripheral region 4 and the grinding material layer 5 are relatively thin in the axial direction of the grinding wheel 1, whereby the pressures arising from a grinding operation tend to distort the grinding wheel peripheral regions 4. The direction of the distortion is schematically indicated in FIG. 2 which is a greatly enlarged fragmentary view of a tooth 8, a gullet 6, a tip 9, together with the grinding wheel peripheral region 4 and associated grinding material layer 5.

During the grinding operation the wheel 1 is moved downwardly in the direction of the arrow 'A', and in the course of such grinding, distorting forces are produced in the sense indicated by the arrow 'B' at the peripheral region 4 of the grinding wheel.

It is convenient to note that FIG. 2 illustrates a partially ground front face 10 and that during grinding the layer 5 of grinding material wears away generally in the manner shown at 12.

Figure 3:
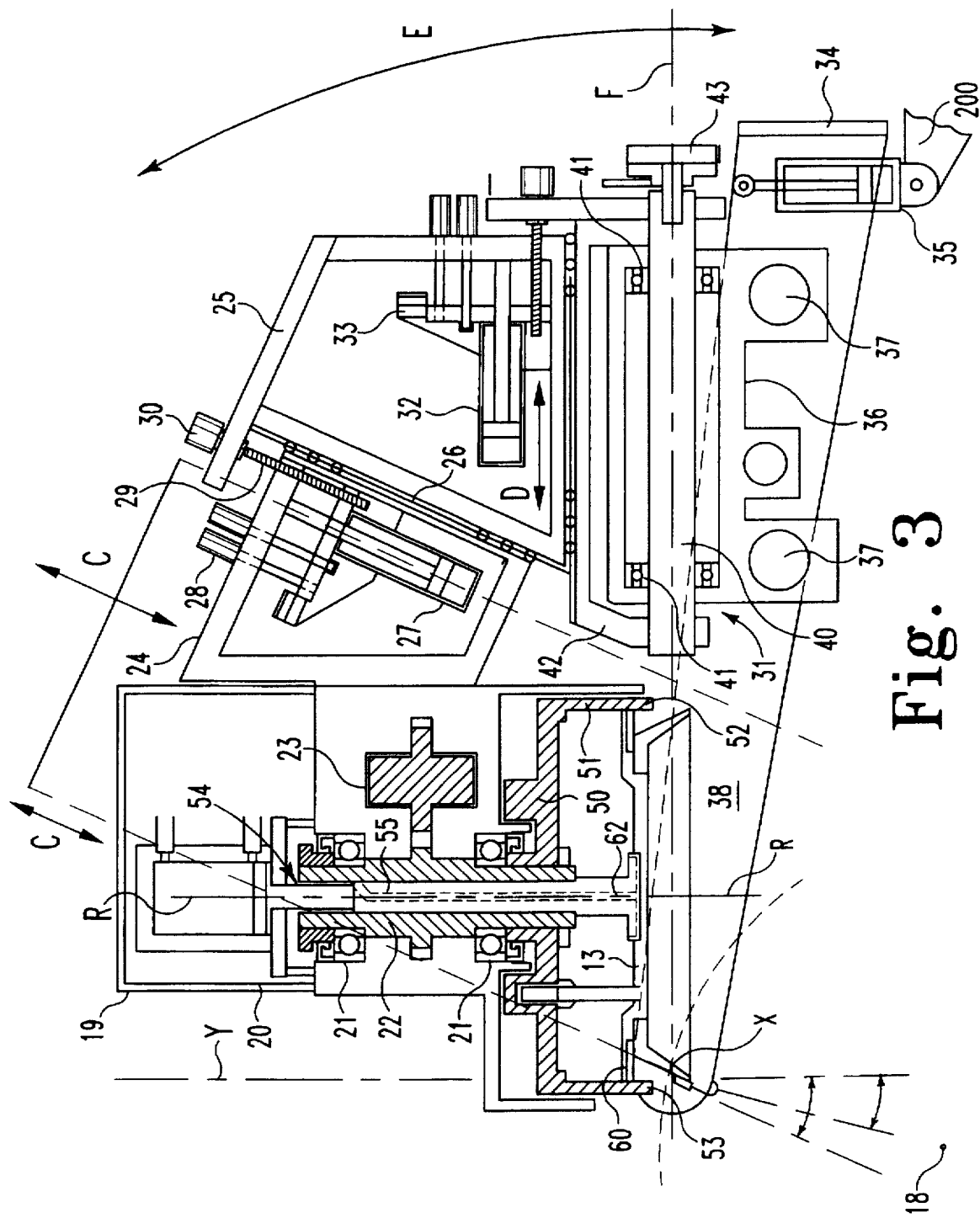
FIG. 3 is a sectional side view of a first embodiment of a machine incorporating the concepts of the invention and being particularly intended for the grinding of the front faces of saw blade tooth tips.
Figure 4:
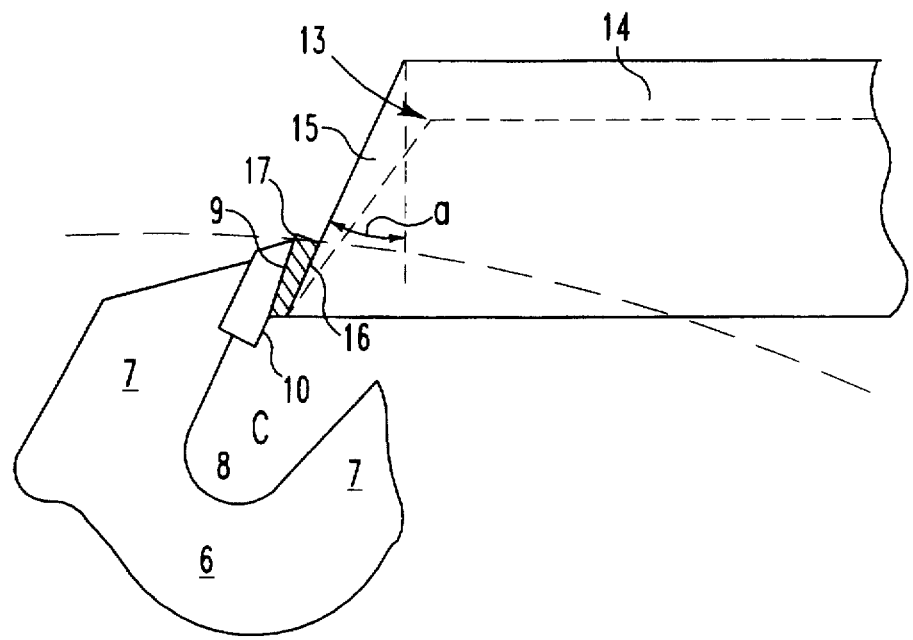
FIG. 4 illustrates to an enlarged scale a detail of the machine of FIG. 3.

To reduce the effect of these distorting forces upon a grinding wheel it is proposed in accordance with a first aspect of the present invention that tile grinding wheel for the grinding of the front faces of the tips of saw blade teeth is of a dished/cup form as shown in FIGS. 3 and 4. This wheel 13 can be regarded conveniently as a flaring cup wheel.

FIG. 4 is a fragmentary view of a grinding wheel in dished/cup form in the course of grinding a front face 10 of a tip 9 on a tooth 7 of a saw Blade 6 having gullets 8. As indicated in the FIG. 4 a cup shaped grinding wheel 13 includes a central main body 4 having a central bore (not shown) for enabling mounting of the grinding wheel 13 to an arbor shown in FIG. 3 and a conical wall 15 provided at its outer peripheral region 16 with a circumferential continuous strip material layer 17 of grinding material such as diamond grinding material. In practice it has been found that the conical wall can have a cone angle a between 15 to 35 degrees of angle with approximately 25 degrees being a preferred value.

In use, the cup wheel 13 and the tip face 10 to be machined are so relatively positioned that during the tip face machining operation the grinding layer 17 is advanced in a direction 'C' running parallel to the required angle for the tip front face 10 being machined.

It will be noted from the FIG. 4 that the conical cup formation ensures that the area/portion of the layer 17 (and of course the corresponding region of the conical wall periphery 16) that is in instantaneous contact with a tip face 10 does not distort (as would be the case with a flat grinding wheel 1) since the instantaneous contact portion/area is fully supported by the remainder of the cup formation of the wheel 13.

Turning now to FIG. 3 this illustrates in cross section apparatus for mounting the cup wheel 13 of FIG. 4, and for enabling the wheel 13 to undergo the operational displacements necessary to machine the front face of tooth tip 9 to be ground.

The machine includes a main frame structure (indicated in FIGS. 5 and 7 as 200) providing an arbor 18 for mounting a circular saw blade 6 including teeth 7 whose tips 9 are to be ground. The machine incorporates arrangements (not shown) for rotationally indexing the blade so as sucessively to bring the next tip 9 to be machined into a machining position. This machining position is coincident with an axis X extending perpendicular to the plane of the sheet on which FIG. 3 is drawn.

In practice, in order to be able to machine a tooth tip front face 10 it is required that the mounting and control arrangements for the associated grinding wheel should enable the grinding wheel:

(a) to advance and retract relative to a tip front face to be machined along the direction C which forms the front face hook angle.

(b) to enable the angular set of the grinding wheel grinding surface to be varied according to the required hook angle of the front face 10;

(c) to be able to advance the grinding wheel from a rest position into the position in which it can make a face grinding pass to remove the requisite amount of tip face material, and to be able to retract the grinding wheel away from any possible contact with the machined front face during the return of the grinding wheel to its rest position.

(d) to enable full length and partial bevelling of the front faces of the tips.

In order to provide for the factors above mentioned the machine of FIG. 3 can be conveniently regarded as comprising a number of sections or units each associated with a particular operational function and interconnected one with the other to enable what ever face grinding requirement needs to be effected.

A first of these units forms the machine grinding head 19 and incorporates the grinding wheel 13 and its associated rotational drive. The section thus includes a housing 20 mounting bearing arrangements 21 for rotatably mounting a shaft structure 22 in alignment with rotation axis R carrying at its lower end the cup shape grinding wheel 13. The grinding head 19 incorporates drive means 23 for transmitting rotational drive to the shaft structure 22. The drive can be by electric motor; or whichever drive means considered appropriate such as, for example, a hydraulic drive.

The grinding head 19 is carried by a support assembly 24 which can be regarded as providing a further one of said sections.

The support assembly 24 is in turn mounted to a further support assembly 25 by way of spaced parallel bearing guide ways schematically shown at 26 which enable precise relative displacements therebetween in such manner that relative slidable movements between the assemblies 24 and 25 is along the direction 'C', that is along the required face angle direction.

The structural inter-relationships between the grinding head 19 and the support assembly 24 are such that the displacement of the support assembly along the direction 'C' correspondingly moves the grinding wheel 13 in such manner that the layer 17 of the grinding wheel 13 is also moved along the direction 'C' that is along the required face angle direction.

The support assembly 24 is displaced relative to the support assembly 25 by means of a hydraulic cylinder/ram 27 controlled by a hydraulic system (not separately shown).

A stop arrangement 28 is provided for controlling the extent of the relative displacement between the assemblies 24 and 25. This stop arrangement 28 will discussed in detail hereinafter. The initial setting of the assembly 24 with respect to the assembly 25 is settable by means of a precise ball screw type adjustment means 29 having an operating head 30. This positional setting, in practice, defines the limit of downward movement of the bracket assembly 24 relative to the assembly 25. The setting is necessary to ensure that at the completion of a downwardly directed machining movement of the grinding wheel 13 the latter cannot touch a tooth gullet 8.

The support assembly 25 is positionally adjustably carried from a mounting unit 31 in such manner that the assembly 25 can be reciprocated, relative to the mounting unit 31 by means of a hydraulic system including a hydraulic cylinder/ram 32, along the direction of the arrow 'D'. A further adjustable stop arrangement 33 whose structure is similar to that of the arrangement 28 is provided for setting the limits of displacement of the assembly 25 relative to the mounting unit 31. In so far as the movement of the grinding wheel 13 is concerned the displacement of the assembly 25 along the direction 'D' moves the grinding wheel head 19 and thus the wheel 13 towards the tip 9 so that the grinding layer 17 is advanced prior to the commencement of a machining movement to the required position relative to the next front face to be ground and which has by then been indexed to axis 'X', and to retract the wheel 13 sufficiently from the tip on completion of front face machining operation to prevent further contact between the layer 17 and the thus machined front face 10 on movement of the grinding wheel 13 upwardly along direction C.

Figure 7:
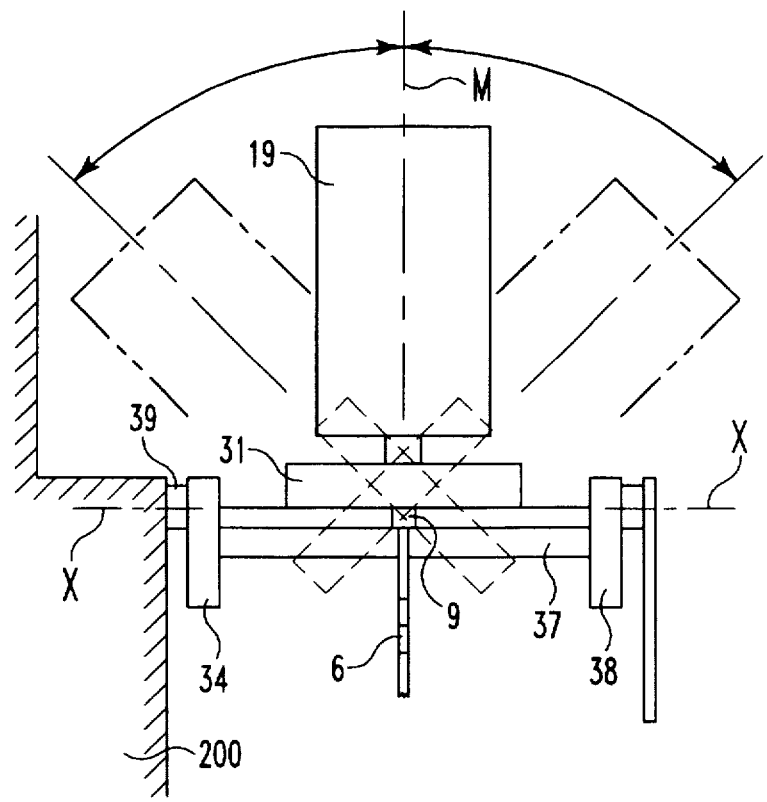
FIG. 7 schematically illustrates the pivoting range of a grinding wheel head of the machine of FIG. 3.
Figure 5:
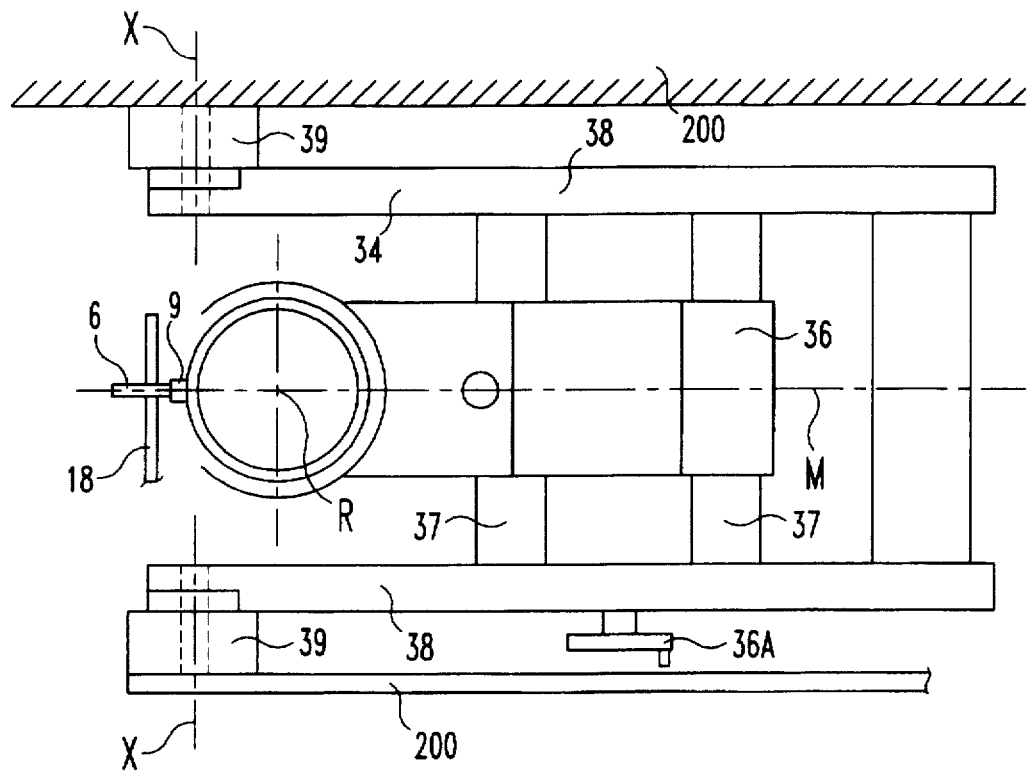
FIG. 5 is a fragmentary plan view to an enlarged scale of a detail of the apparatus of FIG. 3.
Figure 15:
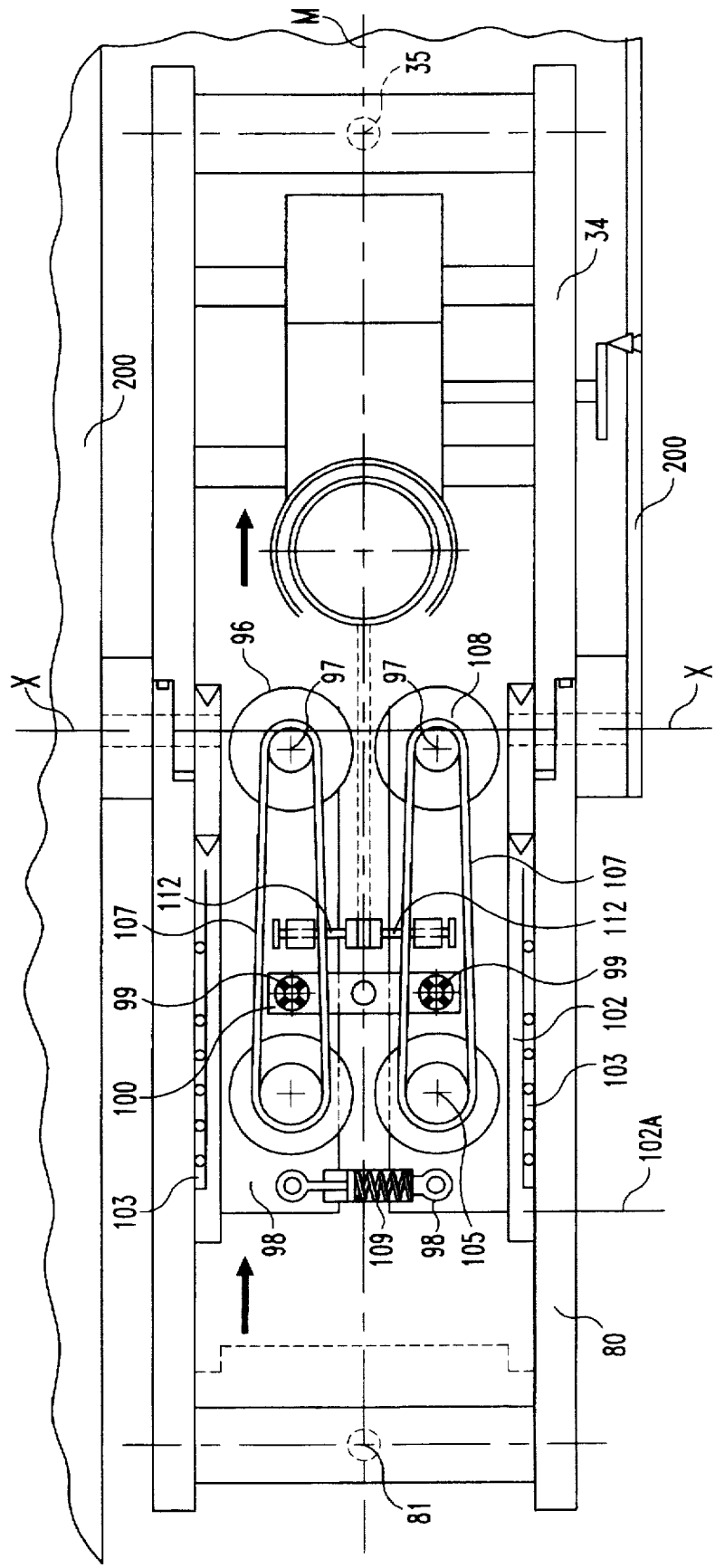
FIG. 15 is an enlarged plan view of an arrangement for profiling the side faces of a tip.
Figure 18:
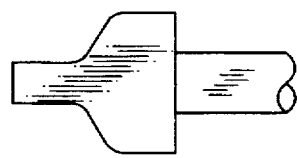
FIGS. 17 to 22 each illustrate a possible profile that can be produced on a tip.
Figure 22:
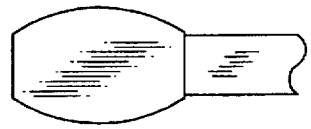
Figure 17:
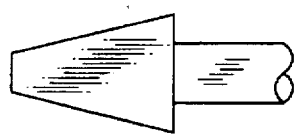
Figure 21:
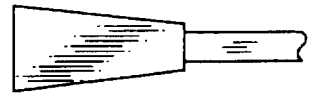

The mounting unit 31 is carried by a yoke unit 34 which is pivotally mounted to the main frame 200 of the machine through pivot 39 in such manner that the pivotal axis thereof coincides with the previously mentioned axis 'X', as shown in FIGS. 5, 7 and 15. The yoke unit 34 can be pivoted up or down under the control of a control means shown in the FIG. 3 as a hydraulic cylinder/ram 35, the sense of pivotal movement of the yoke unit 34 being indicated by the arrow 'E'.

In practice, the construction of the yoke unit 34 is such that the angular positioning of the yoke unit 34 with respect to the machine frame determines the face angle to be machined on a tip.

Figure 8:
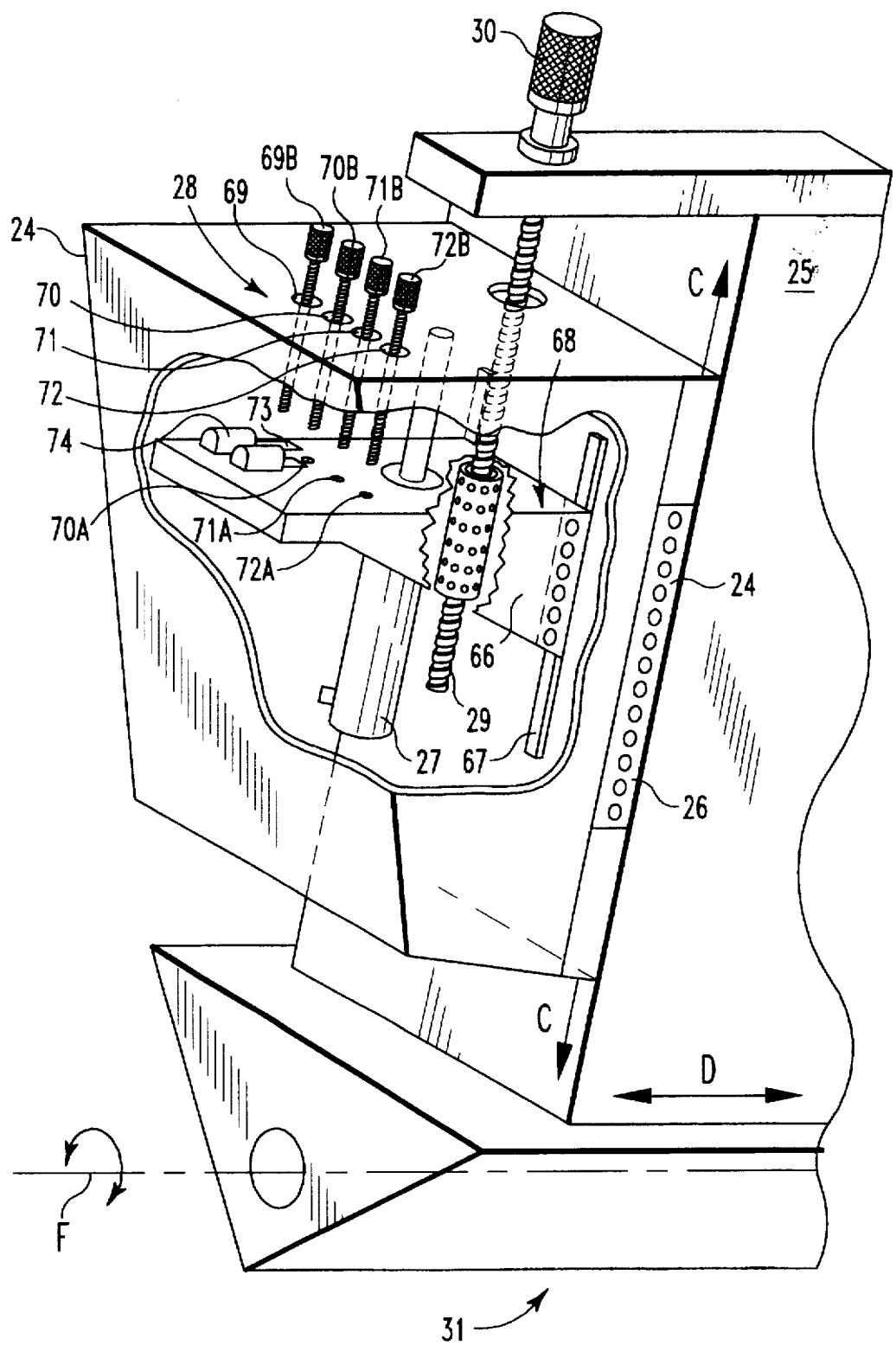
FIG. 8 shematically illustrates detail of a tip height setting arrangement provided in the machine of FIG. 3.

The mounting unit 31 is intended to provide for two modes of movement of the support assembly 25, and thus the axis of rotation of the shaft 22 mounting the grinding wheel 13, with respect to the medial plane of a blade 6 whose tips are to be machined. The first mode involves pivoting the assembly 25 and thus the grinding head 19 whereby the rotational axis of the shaft is tiltable to either side of the vertical plane about an axis 'F' as shown in FIG. 8.

Figure 6:
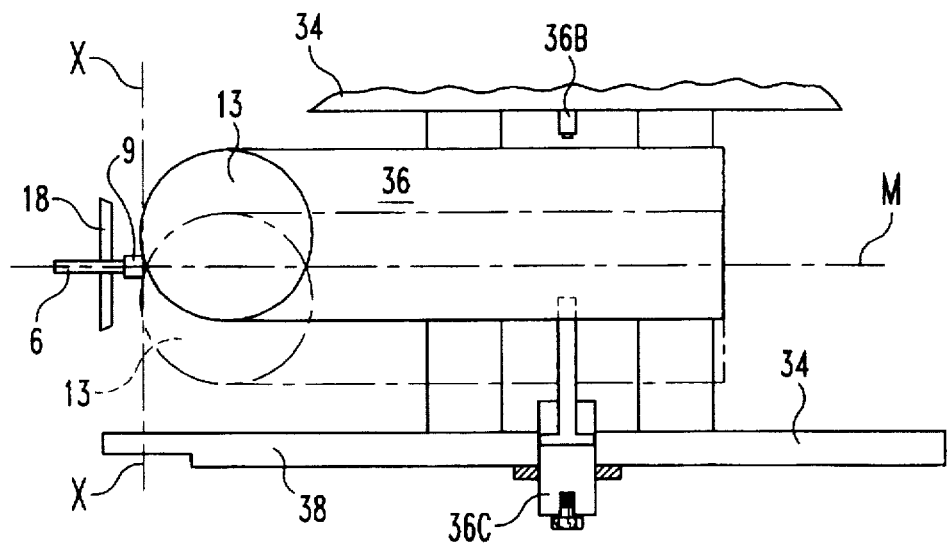
FIG. 6 is a fragmentary plan view of a further detail of the machine of FIG. 3 showing the lateral movement of slide block 36 on members 37.

The second involves a lateral displacement of the assembly 25 in the plane of the axis 'F', that is into and out from the plane of the paper on which the FIG. 3 is drawn. This second movement mode has the effect of displacing the axis of rotation of the shaft 22 to either side of the medial plane of the blade 6 as shown in FIG. 6, and thus the centre line of the associated teeth tips, thereby moving the grinding wheel to such position that the region of contact between the grinding layer 17 and the tip front face 10 is offsettable with respect to the medial plane of the blade 6, and thus the centre line of a tip front face 10. In practice, on grinding the front face when the grinding wheel is in such an offset position the front face can be bevelled at tile side to which the grinding wheel 13 has been laterally displaced.

The mounting unit 31 includes a slide block 36 slidably engaged with two transverse members 37 forming part of the yoke 34 and engaging in the side rails 38 of the yoke 34. The slide block 36 is positionally adjustable lengthwise of the members 37 by means of a hydraulic cylinder/ram 36C 39 which is arranged to be able to displace the slide block to either side of the medial plane M of the blade by presettable distances as is shogun in FIG. 6. A manual control 36A is provided for setting the central position of the slide block to take into account the thickness of a blade.

The manual control 36A can comprise a screw threaded arrangement so as to adjust the central position of the slide block 36 to take into account differing thicknesses of saw blades 5. This is shown in FIG. 6.

When correctly set relative to the yoke 34 the central longitudinal plane of the slide block 36 coincides with the vertical plane containing the axis 'F' as is shown in FIG. 5. Stop means (36B) are provided for limiting displacement to either side of the central position of the slide block 36. The stop means setting range is such as to enable front face bevelling within a range of 5 to 25 degrees of arc.

An axially directed shaft 40 is supported from the slide block 36 by means of bearings 41. A support bracket 42 carrying the assembly 25 is secured to the shaft 40. The bracket 42 is lockable in the position in which the support assembly 25 effectively supports the head unit 19 in the position in which the axis of the shaft 22 is vertical by an electromagnetic locking device 43. A hydraulic ram (not shown) is provided for pivoting the bracket 42 and thus the grinding head 19. The pivoting can be to either side of the central plane M containing the axis 'F'. The tilting feature is shown in FIG. 7. In this FIG. 7 the extremes of the tilt positions for the head unit 19 are shown in dashed lines.

The extent of pivoting of the grinding head 19 to either side of this plane can be at any required angle up to forty five degrees of arc. It will be appreciated that control means (not shown) are provided for ensuring that the tilt of the grinding head is accurately repeatably settable to the required degree of tilt.

To effect grinding of a front face the ram 27 is operated to lower the grinding head to cause the wheel 13 and thus the layer 17 to make a grinding pass across the front face. At the end of the stroke, this being defined by the stop arrangement 28, the ram 32 operates to move the wheel 13 away from contact with the tips face 10 and the ram 27 is operated to lift the wheel 13 away from engagement between the teeth 7 of the blade 6 whereafter the indexing arrangement is caused to index the blade 6 to bring the next tip to be machined to the position 'X'.

It will be understood that the position of the axis 'X' does not change and can thus be regarded a prime reference position for the machine.

The FIG. 3 also illustrates arrangements for enabling a further grinding wheel intended for the grinding of the top faces 11 of the tips 9 to undergo the displacements required to achieve requisite grinding of such top faces. Thus to enable machining of tile top faces of the tips the head unit 19 is modified as to incorporate a second grinding wheel 50 which is coaxial with the cup wheel 13.

Figures 9, 10:
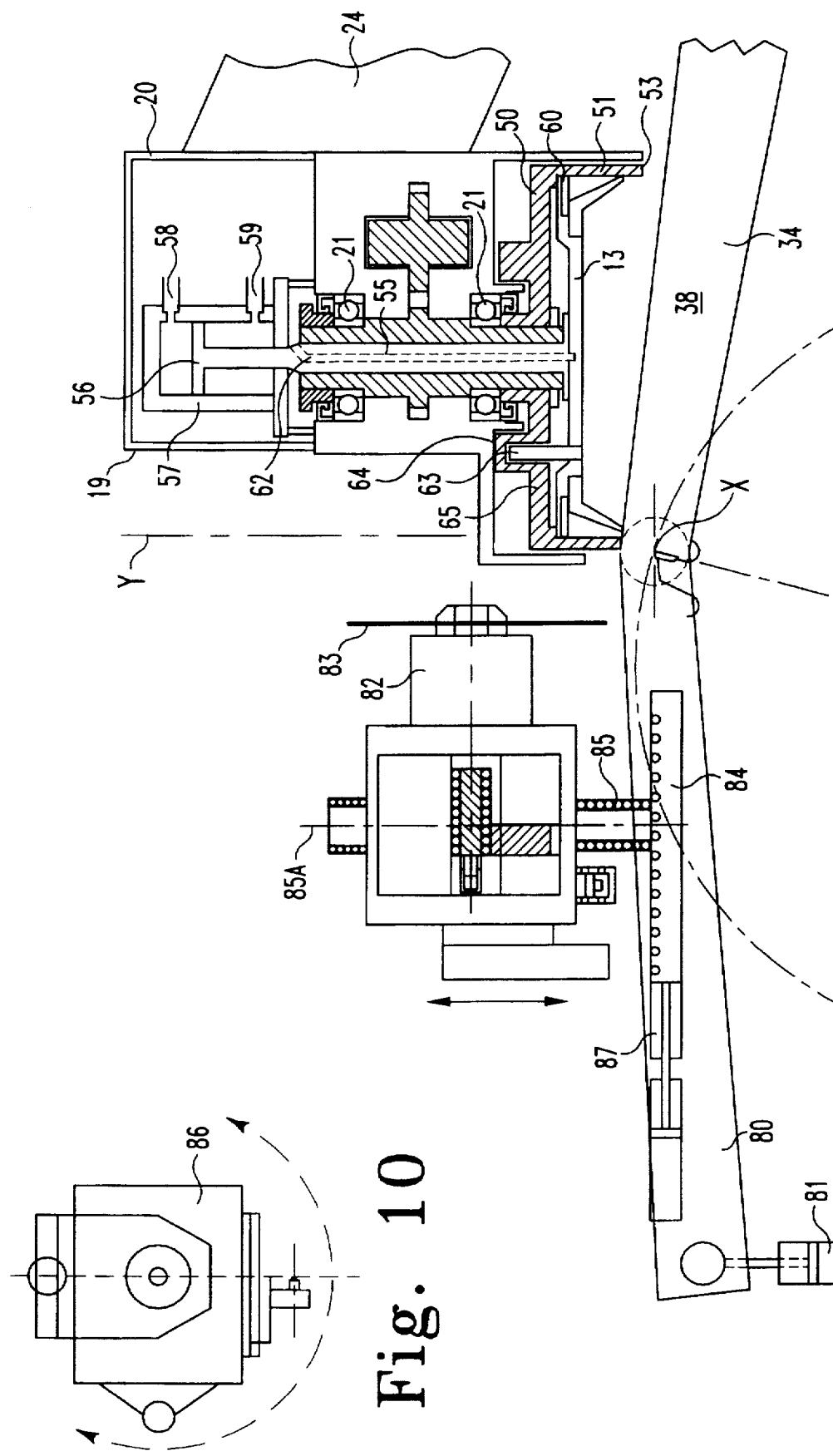
FIG. 9 is a part sectional view of the machine of FIG. 3 and additonally incorporating means for effecting steel relief angle machining; quill grinding and top face slotting.
FIG. 10 is a plan view of the left hand side of FIG. 9.

For the double grinding wheel construction the shaft 22 connects with the second grinding wheel 50 which essentially comprises a cylindical wall part 51 concentric with the axis of rotation R of the shaft 22 and provided with a continuous layer 52 of grinding material on its lowermost annular face 53. The shaft 22 in this embodiment has an axial through bore 54 within which is located a support shaft 55 for the cup grinding wheel 13 previously discussed. The shaft 55 of the cup wheel 13 is axially displaceable with respect to the shaft 22 so that the cup wheel 13 can be selectively positioned in a retracted position as is shown in FIG. 9 in which the wheel 13 is totally shrouded by the cylindrical wall 51.

With this relative positioning the cylindrical grinding wheel 50 is in a position to effect a grinding operation upon the top faces of the tips on a blade whereas the grinding wheel 13 has been moved to a position in which it cannot contact the front face of any tip.

The upper end of the cup wheel shaft 55 connects with a piston 56 moveable in a cylinder 57 which is positionally fixed relative to the shaft 22.

The relative displacement of the cup wheel 13 with respect to the cylindrical wheel 50 is conveniently effected hydraulically by way of oil flow ports 58,59.

In order to prevent ingress of grinding detrius into the space between the two grinding wheels 13 and 50 a wiper ring 60 closes off tile space 61 defined between the two wheels 13 and 50. To prevent upward distortion of the wiper ring 60 when the cup wheel 13 is moved downwards into its operational position an air bleed path 62 is provided between a location upwardly of the shaft 22 and the space 61 between the two grinding wheels 13,50.

Rotational drive for the cup wheel 22 is derived via connection pins 63 (only one shown) engaging in complementary bores 64 in the main body 65 of the cylindrical wheel 50.

Downward movement of the cup wheel relative to the cylindrical wheel 50 into its operational position effectively automatically moves the cylindrical top face grinding wheel 50 to its inoperative position.

Retraction of the cup wheel 13 upwardly, to its rest position automatically brings the top face grinding wheel into its operational position.

In relation to the grinding of the top faces of a tip there is a frequent requirement that the top face height should vary from tip to tip. In the case of machines presently available only two tip heights are possible. In practice, this situation does not satisfy present day requirements for a wider range of tip heights. In accordance with a further aspect of the invention the machine of the present invention affords the possibility of arranging for as many heights as may thought useful, for example, from one to five different heights. In practice, the height variation is normally effected in such manner on sucessive teeth as effectively to form groups of teeth.

The variation of the heights is effected by the adjustable stop arrangement 28 provided upon the support assembly 24. This height adjustment arrangement 28 is such that in order to change the grinding height for a tip top faces, it is merely necessary to select the relevent one of a number of stops controlling the extent of downward movement of the support assembly 24 with respect to its support assembly 25.

When it is required to machine the tip top faces it is necessary to changeover the grinding wheels so that the wheel 50 becomes operational and also to alter the inclination of the yoke unit 34 so that the axis of rotation of the grinding wheel 50 is inclined to the vertical at such angle that the lowermost face 53 of the annular layer 52 of grinding material is set to the required top face relief angle.

To effect this operation it is necessary to displace the grinding head unit in which at this point of time the cup wheel 13 is exposed for grinding to the left by the ram 32 sufficiently to ensure that on moving the support assembly 24, and thus the grinding head 19 and the cup wheel 13, upwardly to the top of its upward stroke relative to the support assembly 25 by operation of the ram 27 the wheel 13 cannot contact the previously ground front face 10. The cup wheel 13 is then retracted to the raised position shogun in FIG. 1 by suitable displacement of the piston 56 in its cylinder 57 so as effectively to expose the cylindrical wheel 50 as shown in FIG. 9. In a variation of the control of the displacement of the wheel 13 relative to the wheel 50, the wheel 13 can be resiliently loaded towards its retracted position so that on release of the hydraulic ram pressure used to lower the wheel 13 into its operational position the latter automatically returns to the retracted position.

After the grinding wheel 13 has been raised relative to the grinding wheel 50 the latter is moved downwards to the required position by operation of the ram 27 to lower the support assembly 24 relative to the support assembly 25 thereby to set the grinding material surface 53 to the height necessary to grind the tip height desired. It will be understood that the stop arrangement 28 will have been set to achieve the required result as will be discussed hereinafter.

The actual grinding of the top face 11 involves passage of the grinding wheel face 53 across the surface of the top face 11 and this is effected by displacement of the support assembly 25 with respect to the mounting 31 by operation of the ram 32 to move the assembly 25 and thus the grinding head 19 to the left in the direction 'D'.

If it is desired to bevel the top face 11 the grinding head will be tilted by the requisite angle of tilt as above discussed. A grinding pass of the wheel 50 will produce a bevel since the grinding wheel 50 will be brought into contact with a marginal edge region of the top face.

It will be appreciated that the extent of the grinding head tilt determines the extent of bevelling.

Referring now to FIG. 8 this schematically illustrates details of the stop arrangement 28.

This figure shows in outline the relative positions of the support assemblies 24 and 25 and very schematically one of the bearing guide ways 26.

The stop arrangement 28 includes a support plate or block 66 which is mounted for relative slidable movement with respect to the remainder of the assembly 24, by means of slide bearing units 67, therebeing one to each side of the block 66.

In practice, the upper surface 68 of the block 66 is intended to provide a reference surface which is positionally settable with respect to the support assembly 25 by means of the ball screw type adjustment means 29 and its operating head 30. It will be noted that rotation of the head 30 in a first sense will raise the block relative to the support assembly 25 whilst rotation in the opposite sense will lower the block 66 relative to the support assembly 25.

The ram rod 27A of the hydraulic cylinder/ram 27 is operationally connected between the support assemblies 24 and 25 and passes through the block 66 so that the block itself does not impede the movements of the cylinder/ram 27.

A series of rods 69,70,71, and 72 depends downwardly from the top of the support assembly 24 structure each rod is able to engage with clearance a corresponding bore, 70A, 71A and 72A in the block surface 68. Each of the rods 69–72 is intended act as a stop pin. In order that the operative lengths of the rods can be selectively adjusted the rods are respectively provided with operating beads 69B,70B,71B, and 72B whereby the rods can be shortened or increased in length according the required positions of the lower ends of the rods with respect to the remainder of the support assembly 24.

As so far described on downward movement of the support assembly 24 relative to the support assembly 25 has the effect of moving the lower ends of rods 69, 70, 71 and 72 towards the bores 69A,70A,71A and 72A and ultimately into the bores to a depth depending upon the extent of downward movement of the support assembly 24.

If the entrance of the lower end of any one of the rods is prevented it follows that further downward movement of the support assembly is prevented.

It, therefore, follows that selective prevention of the rods from entering their associated bores gives, since as stated the rods are of differing lengths, a range of positions at which downward movement of the support assembly 24 is prevented. If the lengths of the rods are related to the heights of tips to be ground and also the maximum depth allowed for a machining operation on a front face it will be apparent that the simple action of preventing rods from entering bores provides a multi-position stop arrangement. This concept of preventing the entry of rod ends into Bores for the purposes of forming a movement stop function provides further aspect of the invention.

The entry of the rod ends into the associated bores is prevented by positioning a stop plate 73 above the entrance to the associated bore. In the embodiment shown each bore/rod combination has associated therewith a plate 73 which is movable by a solenoid 74 from a retracted position (as shown in relation to rods 70,71 and 72) into a bore blocking position (as shown for the plate 73 associated with the bore 69).

Thus, whenever a plate 73 is positioned by its solenoid 74 over the entrance to its associated bore thereby preventing entry of the associated rod further downward movement of the support assembly 24 is prevented. Arrangements (not shown) are provided for stopping further ram pull-down whenever a rod 69,70,71 or 72 encounters a stop plate 73.

In a practical arrangement the rod 69 is associated with the highest tip setting; the rod 70 with a next highest tip setting; the rod 71 with the lowest tip height. Finally, the rod 72 is associated with limiting downward movement of the cup grinding wheel 13.

It will be understood that by providing more rods and associated solenoid controlled blocking plates 73 further tip heights can be defined.

It will also be noted that adjustment of the operating head 30 simultaneously sets the reference level for all of the rods so that effectively all of the rods can be simultaneously moved so that various ranges of tip heights are possible.

If desired the above discussed height adjustment unit could be replaced by a stepper motor system and its associated electronic control equipment. However, it is considered that the above discussed mechanical height adjustment unit offers many advantages over a complex electronics control system for achieving the same effect.

It is important to note that a machine which is capable of machining saw blade teeth tips top and front faces bevelled and not bevelled has Been disclosed which is of such construction that all the requisite grinding wheels and their associated support and operational movement producing arrangements have been located to the right hand side (as seen in the Figures) of the vertical plane Y containing the above defined reference axis 'X'.

In practice, this represents a radical departure from the structural arrangements and operational requirements of saw blade tip grinding machine presently known since all of these known machines involve the swinging of massive and weighty grinding heads from the front to the rear of a tip being machined in order to merely to achieve front and top face machining capability on the same machine.

Because of this basic structural requirement of the known machines it has hitherto been impossible to provide on the same machine additional grinding facilities such as for side face grinding, and the so-called steel relief grinding etc.

Thus, in accordance with a further aspect of the present invention there is provided a machine which can simultaneously incorporate grinding wheels for effecting at least top face/front face machining or both top and front face machining together with other tip face machining facilities such as side face, steel relief, face profiling, etc., for a single indexing of a tooth to the machining position.

Referring now to FIG. 9 this illustrates a machine of the present invention when incorporating facilities for carrying out steel relief grinding.

In practice, a problem arises in the use of diamond wheels for grinding hard material tips mounted to the teeth of a steel blade in that a diamond wheel which is suitable for the machining of very hard material is not suitable for the machining of steel since the grinding speeds for steel are much less than those for hard materials such as Tungsten carbide and since the use of incorrect speeds rapidly damages the diamond wheels. Thus, it is of importance particularly in the resharpening of tipped saw blades to ensure that during any grinding or regrinding the steel of the tooth cannot be contacted by the diamond wheel provided for the tips grinding.

In order to overcome this difficulty it is usual to mount the saw blade to a second machine to carry out the required steel relief grinding operation. As will be clear this involves time consuming transfer of the blade from one machine to another together with problems in resetting the partially machined blade to a correct machining position for further machining operations.

In discussing the machine of FIG. 9 those parts thereof which have been previously considered will be identified by the same reference numerals.

The machine of FIG. 9 is provided with a second pivotally mounted yoke unit 80, whose pivotal axis X coincides with that of the yoke 34.

The yoke is angularly displaced by a ram unit 81. A motor unit 82 for a steel relief grinding wheel 83 is mounted to a support platform 84 by way of a column 85 which allows the motor unit and thus the wheel to be pivoted about an axis 85A by a further ram unit 86 (not shown).

The platform 84 is displaceable in a direction lengthwise of the yoke 80 by means of a ram unit 87 so that the wheel 83 can be moved towards and away frown the tip grinding position axis 'X'. The platform and associated ram unit are transversely displaceable relative to the yoke 80 in a manner similar to the displacement of the slide block 36 of the mounting unit 31 for the support assembly 25 and for generally similar purposes i.e., bevelling in relation to the positioning of the grinding wheel 83 with respect to the blade tooth.

A cam and associated follower arrangement can be provided for lifting and lowering the grinding wheel 83 according to the required profiling for the steel relief grinding operation.

It will be understood that during the machining of the tip top and front faces the steel relief grinding wheel 83 will have been displaced by the ram 87 to a retracted position in which it cad, not impede the top and front face machining operations.

It will be understood that during the movement of the wheel 83 to its retracted setting the wheel has to be lifted upwards to clear the next tooth to be machined. This can be effected by suitable profiling of the cam arrangement and/or by the provision of a ram unit (not shown).

To carry-out a steel relief grinding operation the front and top face grinding head 19 is moved to its raised position and the relief grinding wheel is advanced by the ram 87 towards the grinding position. The yoke 80 having been previously set to the angle necessary to set the grinding wheel 83 to the required relief angle.

The ram 87 is then actuated to cause the blade 83 to perform, under the control of the cam arrangement, the required movements of the wheel 83 along the steel surface to be ground.

Figure 11:
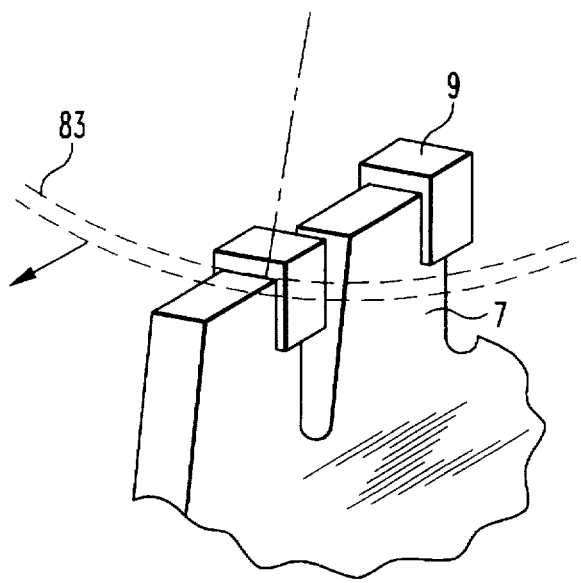
FIG. 11, schematically illustrates steel relief machining.

FIG. 11 very schematially illustrates the steel relief operation.

Figure 13:
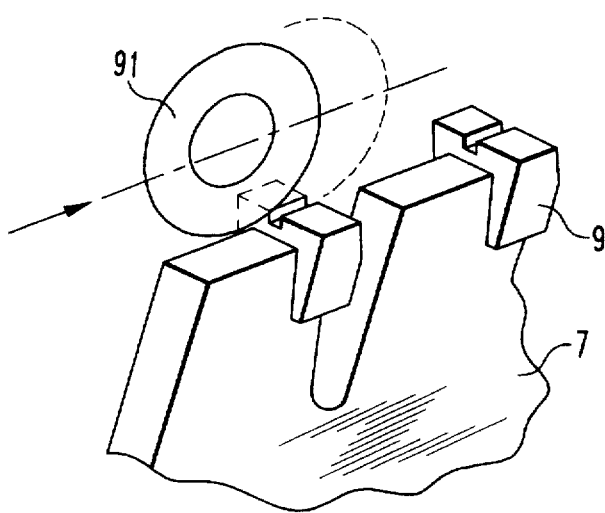
FIG. 13, schematically illustrates slotting of a top face.

It is to be noted that by replacing a steel relief grinding wheel 83 with a suitably dimensioned diamond wheel 91 the tips top could be cross grooved as shown in FIG. 13.

Figure 12:
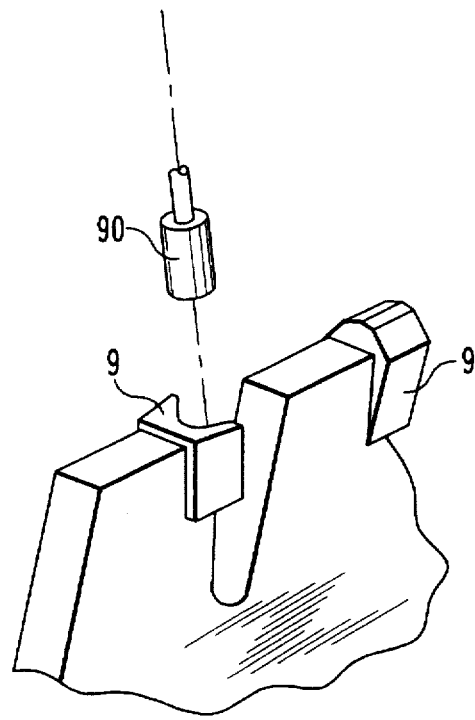
FIG. 12, schematically illustrates front face grooving by a quill grinding wheel.

If it is required to provide the machine as so far discussed with the facility of being able to groove or profile the top or front faces of a tip in the manner shown in FIG. 12 a so-called quill type grinding wheel can be provided.

As is indicated in FIG. 12 the quill type grinding wheel 90 is mounted to the steel relief grinding wheel assembly. In the embodiment of FIG. 9 the steel relief grinding assembly is rotatably mounted so that changeover between use of the steel relief wheel 83 and the quill 90, shown in FIG. 12, is in the manner similar to the operation a turret tool changer construction such as is used on lathes to enable easy tool changeover.

The drive for the quill grinding wheel can be pneumatic or electric as considered convenient.

FIG. 10 schematially illustrates the turret like feature 86 which enables positional setting of the wheel 83 for bevelling purposes, and for centralising the quill 90 with respect to a tip to be machined by [he quill 90.

It is important to note that with the quill wheel assembly as proposed it is possible to quill grind the top and front faces of a tip whilst the tip is in the same indexed position, and also whilst it is in the same position involved with the top face and front face machining operations. In other words the proposals of the invention eliminate the need for separate machines and the problems associated with the use of separate machines.

Figure 14:
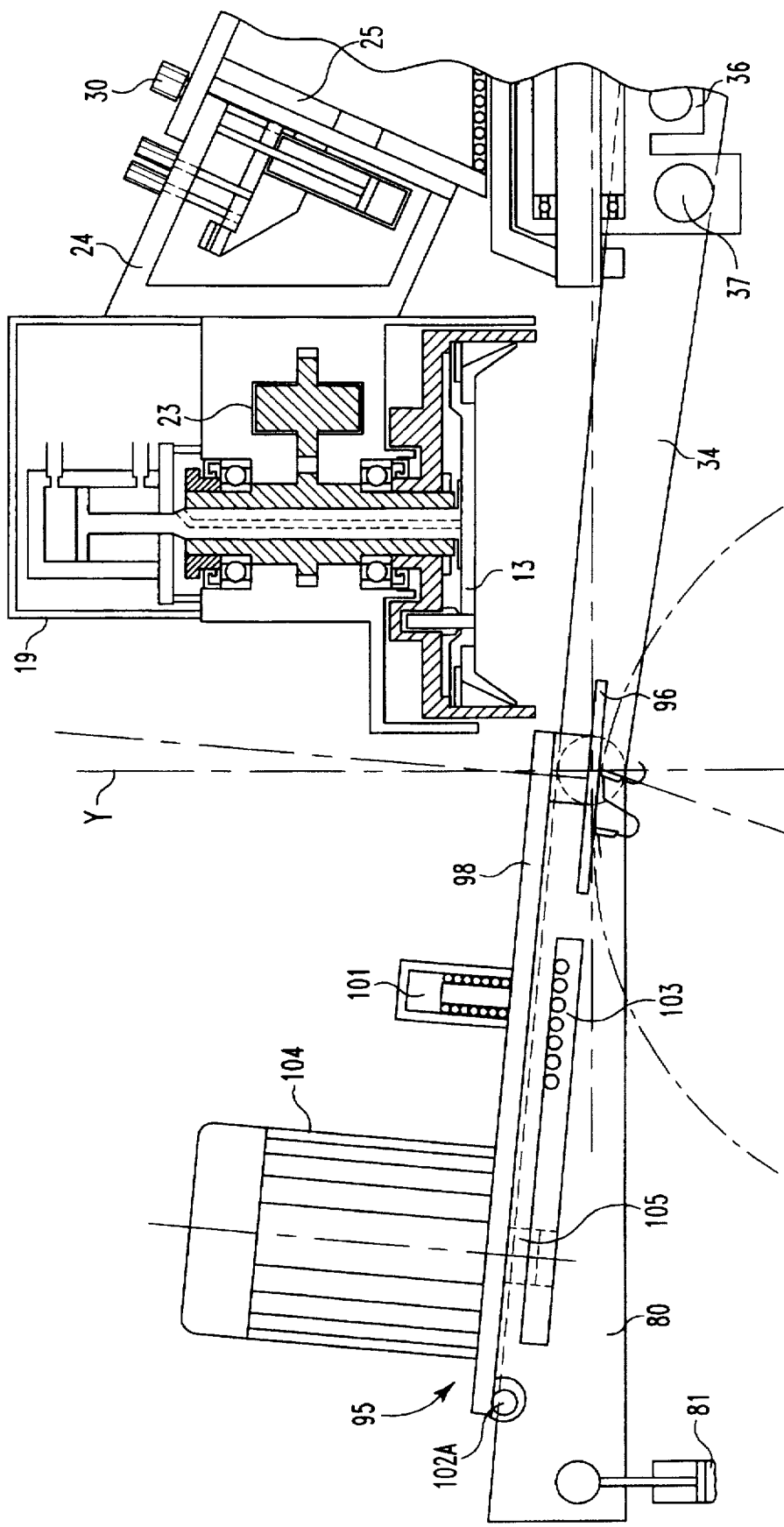
FIG. 14 is a sectional view of embodiment of a machine incorporating the concepts of the invention and being particularly intended for the grinding of the front, top and side faces of saw blade tooth tips.

Referring now to FIG. 14 this also illustrates a machine of the invention incorporating tip side face grinding capability. In the embodiment of FIG. 14 a side grinder assembly 95 is mounted to the second yoke 80.

As before those parts of the machine which have been previously mentioned will receive the same reference numerals and will not be further discussed.

The side grinder assembly 95 incorporates two similar grinding wheels 96 (only one being shown) locatable one to each side of the tip to be machined. The wheels 96 are mutually relatively positioned and set so that both faces can be machined at the same time.

As may be seen from FIGS. 14 and 15 these side grinding wheels 96 are rotatably mounted on drive shafts 97 depending from support plates 98 pivotally mounted via pivot bearings 99 to a plate 100 which in turn is connected by way of a ram unit 101 to a support frame 102 which is itself pivotally mounted to the yoke 80 for pivotal displacement about a pivot axis 102A. The support frame 102 is of such construction as to permit the plate 100 to be displaceable linearly to and from the pivot axis X by way of slide bearings 103.

The mounting of the side grinder assembly is thus such that it is so pivotally mounted to the yoke 80 for pivotal movement about the axis 102A that the side grinding assembly 95 can be pivoted between an operational position as shown in FIG. 14 and a retracted position (not shown) in which the wheels 96 are moved away from the grinding position to permit for example, top and front face grinding by the grinding head unit 19.

Each support plate 98 mounts on the upper side thereof a drive motor 104 having an output shaft 105 projecting to the underside of the support plate and mounting a belt drive pulley 106. The pulley is drivingly coupled via a belt 107 with a belt drive pulley 108 provided upon the grinding wheel shaft.

Thus rotation of the motor drive shaft 105 drives the grinding wheels 96.

Figure 16:
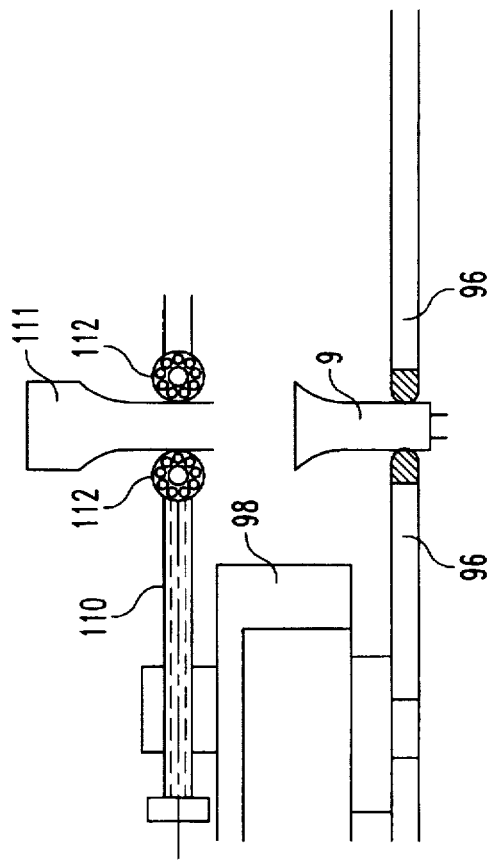
FIG. 16 is a transverse schematic view illustrating the profiling operation.
Figure 20:
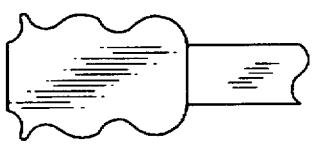
Figure 19:
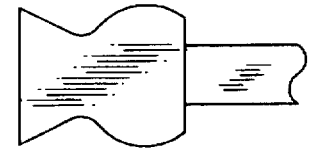

As may be seen from FIGS. 15 and 16 the two support plates 98 are resiliently loaded by a tension spring loaded hydraulic cylinder 109 in such manner that the support plates are biassed to the position in which the grinding wheels do not contact the tip 9 to be ground.

Application of hydraulic fluid to the cylinder 109 pivots the support plates 98 and thus the grinding wheels 96 into operational contact with the side faces of a tip 9 located therebetween.

As has been mentioned the tip side face grinding action involves displacement of the grinding wheels radially of the tips.

A tip grinding shape profile attachment 110 is mounted from the support plates 98 this attachment 110 essentially comprises means for contacting a profile former 111 for the tip shape required, and associated profile cam follower 112 operationally coupled to the associated support plate whereby on moving the grinding wheels 96 radially of the tip 9 will cause the cam followers 112 to follow the form of the profile former 111 and in so doing produce complementary displacements of the grinding wheels towards and away from the medial plane M of the blade and thus the, tip in such manner that the forms of the side faces ground on the tip will replicate the shape of the profile form.

A further important advantage of providing a single machine to enable multi-face grinding is that it is ensures that all of the faces ground are correctly oriented one with the other.

It will be understood that since the side grinder of the present invention involves a profile former that the side faces of the tips can be machined to provide what ever shape required.

FIGS. 17 to 22 respectively illustrate various profiles to which the side faces of the tips can be ground using the side face grinding facilities of the apparatus of the present invention.

The provision of the quill, slotting wheel, steel relief wheel, side grinding wheels and the profiling facility effectively provides together with the top face and front face grinding capability of the grinding head 19 a multi-machine capability affording many possible tip machining combinations of grinding capabilities hitherto only been available by using several several separate machines.

Examples of such combinations are:

(a) Quill plus top and front face grinding:

(b) Steel relief plus top and front face grinding:

(c) Slotting, bevelling, front and side face grinding:

(d) Top, front and side face grinding:

From the forgoing it will be apparent that many other combinations are possible with a single machine incorporating the concepts of the invention as compared with the present day need to use separate machines as would at present be required.

I claim:

1. A machine for performing a plurality of machining operations on each tip of individual teeth of a saw blade comprising: a main frame having a pivot defining a first axis and having locating means for locating a saw blade coincident with a medial plane and so that each tip to be machined is positioned in turn at a machining point coincident with the first axis, a first yoke mounted on the pivot and situated substantially exclusively on a first side of a vertical plane containing the first axis, first machining means for machining at least one face of the tips supported on the first yoke, a second yoke mounted on the pivot and situated substantially exclusively on a second side of the vertical plane containing the first axis, second machining means for machining at least one other aspect of the saw blade supported on the second yoke, and means coupled to the yokes for independently moving the first and second machining means toward and away from the first axis to permit independent contact of selected portions of each tip by both the machining means while each tip is situated at said machining point.

2. A machine as claimed in claim 1 and further comprising support means carried by said first yoke for movably supporting the first machining means relative to the first yoke, first moving means for moving the support means toward and away from said first axis, and control means for controlling the angular position of the first yoke about the pivot.

3. A machine as claimed in claim 2 wherein the support means comprises members fixed to said first yoke parallel to said first axis, a carriage mounted for movement on the members, and further comprising means for moving the first machining means along the members across said medial plane.

4. A machine as claimed in claim 3 wherein said support means further comprises an axle defining a second axis perpendicular to and intersecting said first axis, and bearing means coupling the axle to the carriage for allowing tilting of the first machining means relative to the second axis.

5. A machine as claimed in claim 4 wherein the first machining means includes a housing coupled to the support means, a shaft means mounted within the housing for rotation about a third axis intersecting the second axis, motor means for rotating the shaft means, and at least one machining element coupled to the shaft means.

6. A machine as claimed in claim 5 wherein the shaft means comprises a pair of concentric shafts, each shaft being coupled to a separate machining element, and further comprising means for displacing one of the pair of concentric shafts along the third axis.

7. A machine as claimed in claim 5 and further comprising a support assembly coupling the housing to the support means, means for moving the support assembly at an oblique angle to the second axis, and a plurality of stop means for stopping the movement of the support assembly at a plurality of selected positions.

8. A machine as claimed in claim 1 and further comprising support means carried by said second yoke for movably supporting the second machining means relative to the second yoke, second moving means for moving the support means toward and away from said first axis, and control means for controlling the angular position of the second yoke about the pivot.

9. A machine as claimed in claim 8 wherein the support means comprises at least one plate pivotally mounted to the second yoke at a point spaced from said first axis, and further comprising means for pivoting the at least one plate relative to the second yoke.

10. A machine as claimed in claim 9 wherein the at least one plate comprises a pair of plates positioned on opposite sides of said medial plane, and wherein the second machining means comprises grinding means carried by each of the pair of plates, and further comprising means for moving the pair of plates toward and away from the medial plane.

11. A machine for performing a plurality of machining operations on each tip of individual teeth of a saw blade comprising: a main frame having a pivot defining a first axis, an arbor coupled to the main frame for locating a saw blade so that each tip to be machined is positioned in turn at a machining point coincident with the first axis, a first yoke mounted on the pivot and situated substantially exclusively on a first side of a vertical plane containing the first axis, a housing coupled to the first yoke, a pair of concentric shafts mounted within the housing for rotation about a common axis, motor means for rotating the concentric shafts, separate machining elements coupled to each of the concentric shafts, and means for displacing one of the pair of concentric shafts relative to the other along the common axis to bring one of the machining elements toward said machining point.

12. A machine as claimed in claim 11 further comprising means for biasing the pair of concentric shafts toward nesting of said machining elements one within the other.

13. A machine as claimed in claim 11 further comprising means for inhibiting entry of material between said machining elements.

14. A machine as claimed in claim 11 further comprising means for coupling said housing to the first yoke including at least one member fixed to said first yoke parallel to said first axis, a carriage mounted for movement on the member, and means for moving the carriage along the at least one member so that said machining elements cross a medial plane containing the saw blade.

15. A machine as claimed in claim 14 wherein the means for coupling said housing to the first yoke further includes an axle carried by the carriage defining a second axis perpendicular to the first axis, a housing support mounted for tilting movement about the axle, the housing support having a support surface parallel with the second axis, and a first support assembly mounted on the support surface for movement so that said machining elements can be positioned at a selected tilt angle and position relative to the second axis.

16. A machine as claimed in claim 15 wherein the means for coupling said housing to the first yoke further includes a second support assembly having a first member and a second member mounted on guide ways fixed to the first support assembly for movement at an acute angle relative to the second axis, means for positioning the first member at a selected location relative to the first support assembly, means coupling the first and second members for moving the second member relative to the first along the first support assembly guide ways, and stop means defining stopping positions for the movement of the second member.

17. A machine as claimed in claim 11 further comprising a second yoke mounted on the pivot and situated substantially exclusively on a second side of the vertical plane containing the first axis, and machining means supported on the second yoke.

18. A machine as claimed in claim 17 wherein the second machining means comprises a quill type grinding wheel.

19. A machine as claimed in claim 17 wherein the second machining means comprises means for contacting a profile former defining a profile shape of at least one face of the tips of the saw blade teeth.

20. A machine for performing a plurality of machining operations on the tip of individual teeth of a saw blade comprising: a main frame having a pivot defining a first axis, a first yoke mounted on the pivot and situated substantially exclusively on a first side of a vertical plane containing the first axis, a first machining means movably supported on the first yoke, a second yoke mounted on the pivot and situated substantially exclusively on a second side of said vertical plane, a second machining means movably supported on the second yoke, a first moving means for moving the first machining means toward and away from the first axis, a second moving means for moving the second machining means toward and away from the first axis, and locating means coupled to the main frame for locating a saw blade coincident with a medial plane so that each tip to be machined is positioned in turn at a machining point coincident with the first axis to permit independent contact of selected portions of each tip by both the machining means while each tip is situated at said machining point.

* * * * *